INVENTORS
D.L. KRAFT
E.C. BEASON, JR.
R.O. WELTY

ATTORNEYS

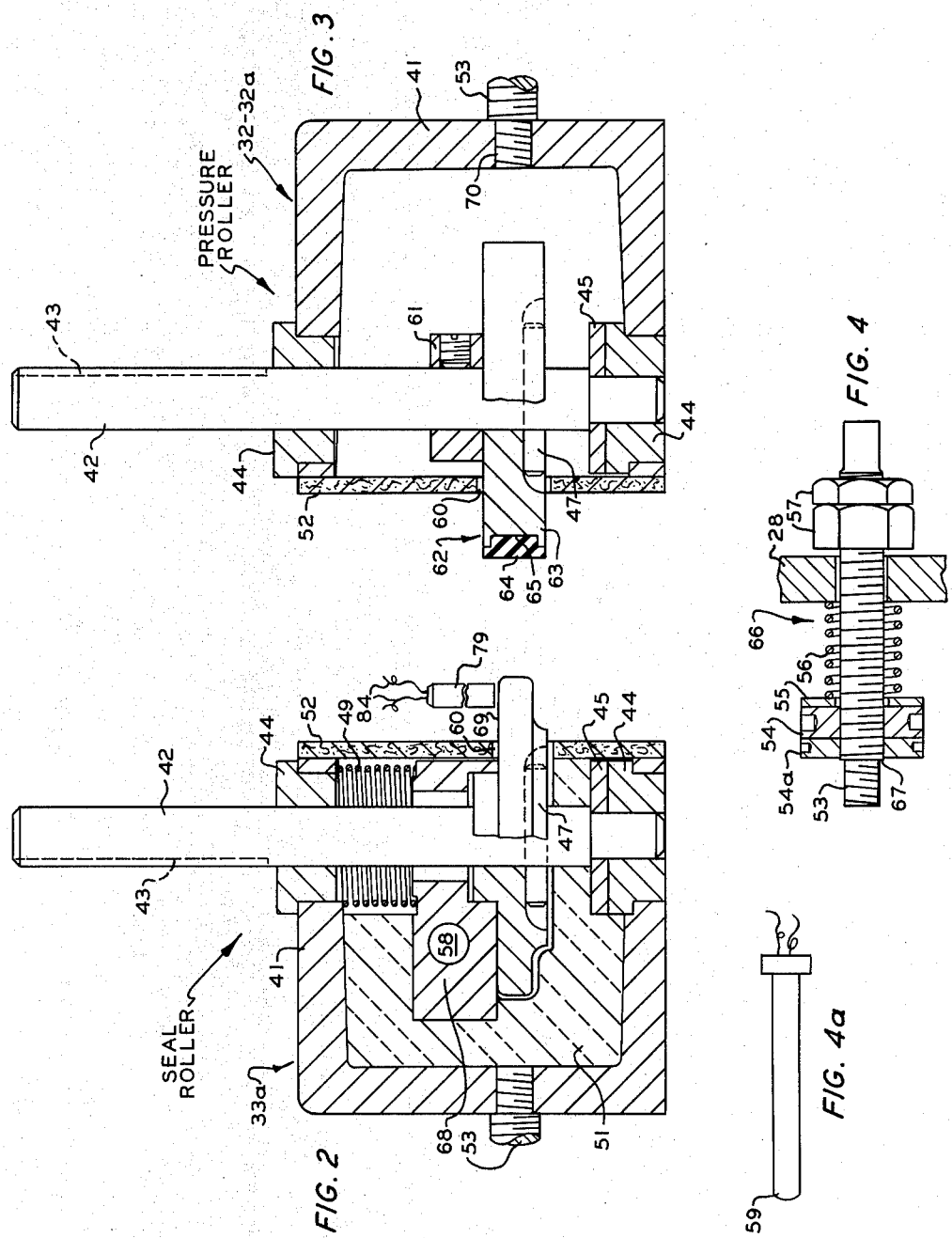

United States Patent Office 3,218,961
Patented Nov. 23, 1965

3,218,961
THERMOPLASTIC BAG SEALER
Donald L. Kraft, Elmer C. Beason, Jr., and Richard O. Welty, Bartlesville, Okla., assignors to Phillips Petroleum Company, a corporation of Delaware
Filed Feb. 10, 1961, Ser. No. 88,507
7 Claims. (Cl. 100—93)

This invention relates to apparatus for sealing plastic materials. In one aspect it relates to apparatus for sealing a film of a polyolefin to another film of the polyolefin. In another aspect it relates to apparatus for sealing a film of a polyolefin to another film of the polyolefin in a continuous operation. In another aspect it relates to apparatus for sealing in a continuous operation conventional and linear polyethylene bags.

Some prior art heat-sealing apparatus employs heater bars to preheat and to seal films of polyolefins. Other apparatus employs sealing rollers heated by radiation from a heating source. Still other apparatus employs heating bands for strip heaters for bag sealing purposes. Other prior art sealers crimp the surfaces to be sealed or while being sealed.

The sealer of the present invention is so devised as to provide free and unrestricted passage of the material to be sealed through the entire apparatus. Rolls are used throughout to accomplish this purpose in contrast to some prior art apparatus which employs bars, etc. for heating and for sealing. The use of bars tends to retard material passage, thus tending to produce wrinkles in one or both films. Obviously, when wrinkled films are sealed to one another the seal may easily be defective. Also a sealed wrinkle surface exhibits an unpleasing appearance.

An object of this invention is to provide an apparatus for sealing plastic materials. Another object of this invention is to provide apparatus for heating sealing the open end of plastic bags. Yet another object of this invention is to provide apparatus for sealing conventional polyethylene and linear polyethylene materials. Yet another object of this invention is to provide apparatus for the continuous sealing of conventional polyethylene and linear polyethylene bags previously filled with materials. Still other objects and advantages of this invention will be realized upon reading the following description which, taken with the attached drawing, forms a part of this specification.

Figure 1:
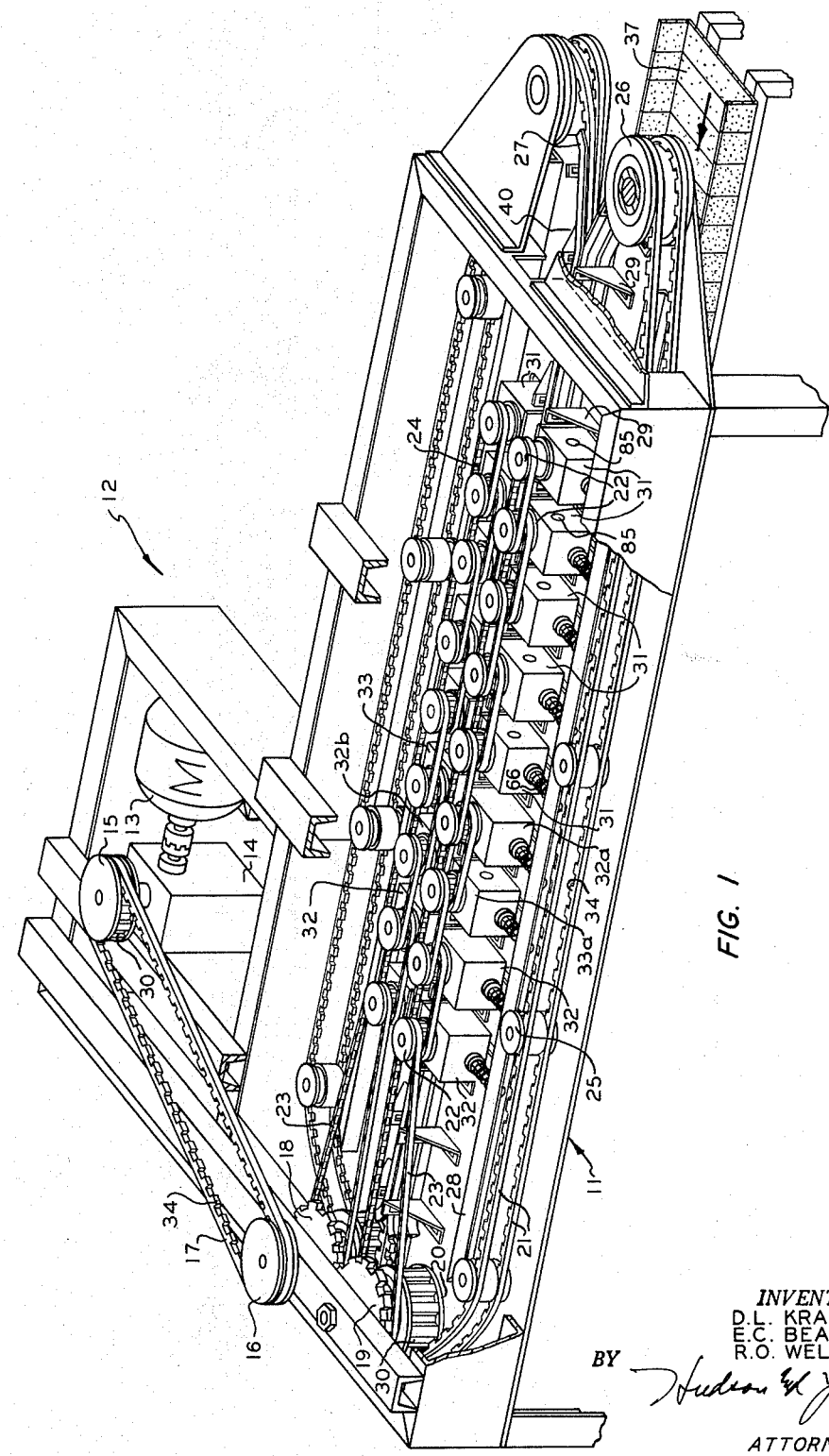
Figure 7A:
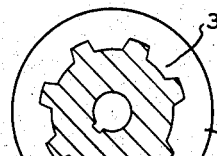
Figure 7:
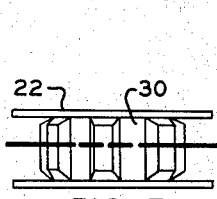
Figure 10:
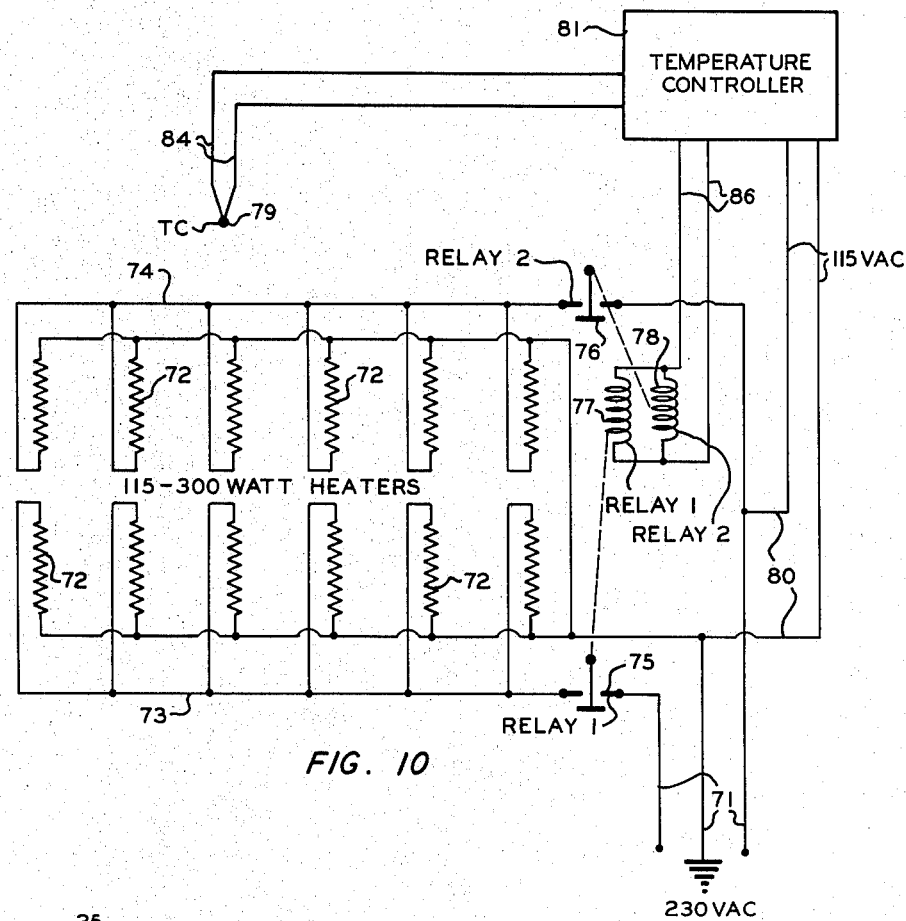
Figure 9:
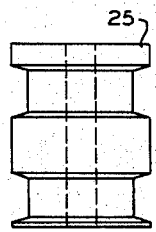
Figure 8A:
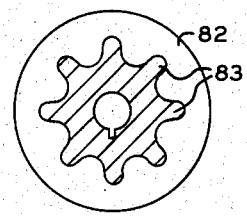
Figure 8:
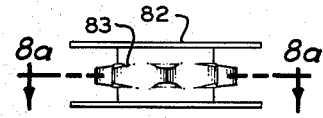

In the drawing, FIGURE 1 illustrates diagrammatically a view in perspective of a complete sealing apparatus of this invention. FIGURES 2, 3, 4 and 5 illustrate, in diagrammatic form, portions of the apparatus shown in FIGURE 1. FIGURE 4a illustrates one embodiment of a portion of the apparatus used herein. FIGURE 6 is an elevational view, partly in section, of a portion of the apparatus of FIGURE 1. FIGURE 7 is a view of a portion of the apparatus illustrated in FIGURE 1. FIGURE 7a is a sectional view taken along the line 7a of FIGURE 7. FIGURE 8 is a view of an alternative piece of apparatus which can be used in place of the apparatus of FIGURE 7. FIGURE 8a is a sectional view taken on the line 8a—8a of FIGURE 8. FIGURE 9 is an elevational view of the portion of the apparatus of FIGURE 1. FIGURE 10 illustrates a wiring diagram employed for providing electrical heat for the apparatus of FIGURE 1.

In the drawing reference numeral 11 identifies a framework suitable for supporting the operating mechanisms of this invention. A frame extension 12 is attached to one side of framework 11 as illustrated for support of the mechanism of the apparatus. In the frame extension 12 is supported a motor 13 which is operatively connected to a speed reducer 14 which in turn operates the drive pulley 15 for operation of the apparatus. The drive pulley 15 drives pulley 16 by way of a belt 17. Mounted on the same shaft as the driven pulley 16 is a drive spur gear 18. The spur gear 18 meshes with a spur gear 19 which is mounted on a shaft along with a grooved drive pulley 20. The grooves on this drive pulley are identified by reference numeral 30. On the same shaft as spur gear 18 and driven pulley 16 is also positioned a grooved drive pulley corresponding to drive pulley 20. The drive pulley 20 drives a pair of belts 21. At the opposite end of the apparatus are belt tightener and guide pulleys 26. Idler pulleys 25 are provided for guiding the movement of belts 21. After belts 21 leave pulley 26 the belts are guided by channel guides 27. These channel guides are small size channel irons supported by supports 29 which in turn are attached to the main frame assembly 11. The specific portion of the main frame assembly to which supports 29 are attached are plates identified by reference numerals 40 and 40a, as illustrated in FIGURES 1 and 6. Immediately below the drive and driven spur gears 18 and 19 are positioned drive pulleys 20, similar to drive pulley 15, for driving belts 23. Belts 23 drive pulleys 22 on the adjacent pressure roller assemblies 32 to be described in detail hereinafter.

The actual sealing apparatus of this invention comprises a plurality of preheat roller assemblies 31, several pressure roller assemblies 32, 32a and 32b, and a pair of sealing roller assemblies 33 and 33a. Each of these roller assemblies is provided with a vertically positioned shaft 42, illustrated in FIGURES 2, 3 and 5. Each of these shafts is provided with a pair of the pulleys 22, one of which, in each case, is a driven pulley and one is a drive pulley. However, the first of the heater assemblies in each sequence is provided only with a single pulley, i.e., a driven pulley. These driven and drive pulleys 22 are all alike and are illustrated in FIGURES 7 and 7a. Belts 24 drive the several pulleys 22 excepting the two pulleys 22 driven by belts 23.

Each of the belts 17, 21, 23 and 24 are U.S. Rubber Company timing belts described in catalog Nos. 183 and 184. Each of these belts is provided with lugs 34 on the pulley sides. The pulleys accordingly are provided with grooves 30 to accommodate the lugs 34. Thus, by provision of these lugs and grooves there is not any chance whatever that any belt slippage can occur.

Figure 5:
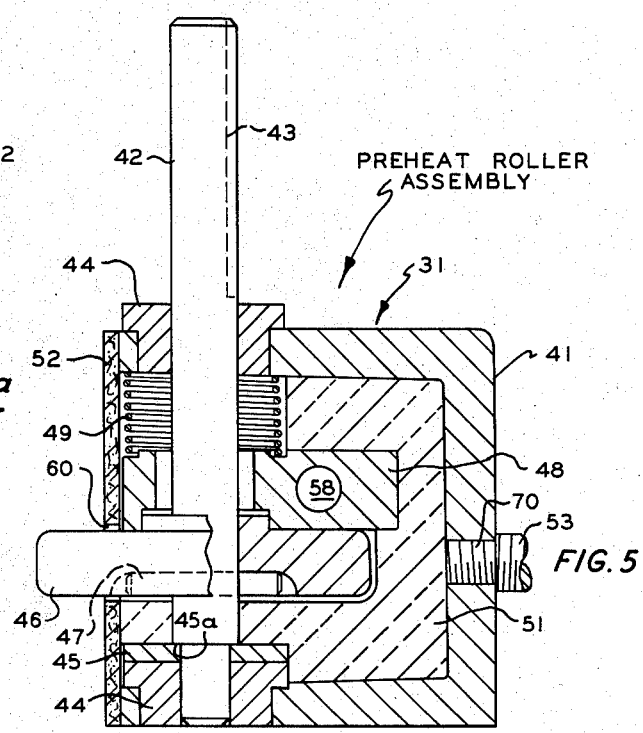
Figure 6:
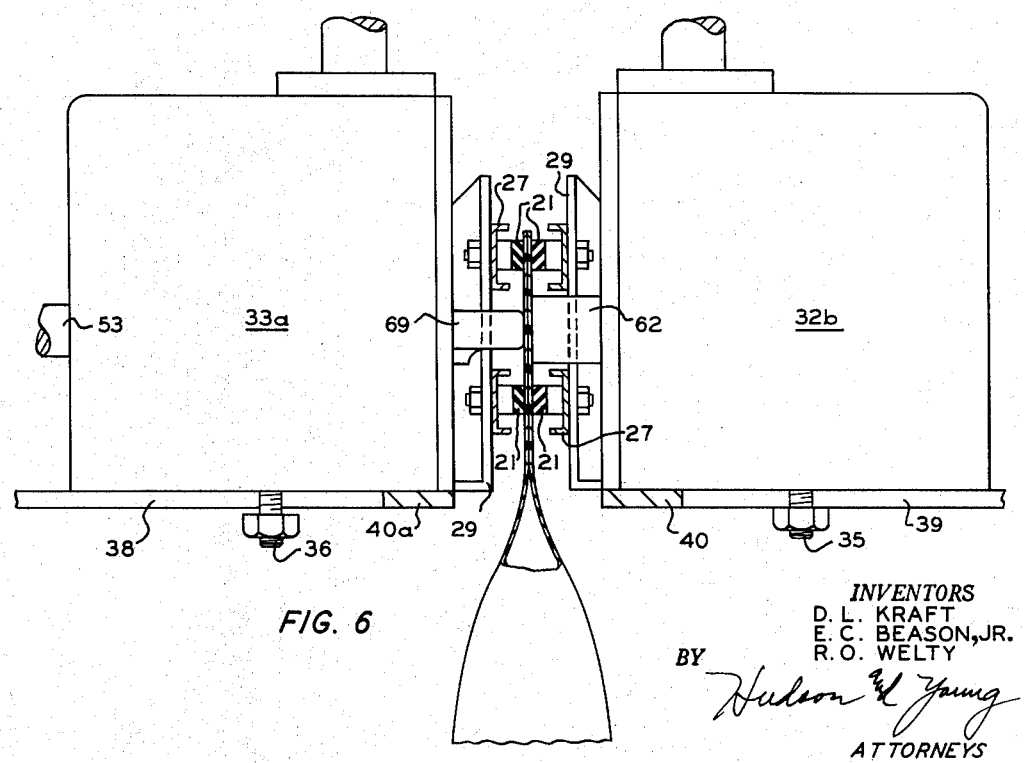

In FIGURE 5 is illustrated a view, partly in section, of a preheat roller assembly 31. This preheat roller assembly comprises a case 41 into which a shaft 42 extends. Bushings 44 provide bearing surfaces for rotation of shaft 42 in the case 41. A conventional washer 45 is termed herein a thrust washer and is for the purpose of providing a bearing surface for shoulder 45a of the shaft. A preheat roller 46 is held in place on shaft 42 by a dowel pin 47. Immediately above roller 46 is positioned a heater block 48. This heater block is substantially rectangular in shape so that it cannot rotate when roller 46 rotates even though the block is in frictional contact with roller 46. This heater block is constructed preferably of a copper graphalloy. The heater block 48 has an opening 58 substantially throughout its length for accommodation of a heater. Heater 59 as illustrated diagrammatically in FIGURE 4a is sized such that it will fit snugly into the opening 58. A heater suitable for this purpose is a Watlow unit type heater such as manufactured by the Watlow Electric Company, 1376 Ferguson Ave., St. Louis 14, Missouri. A suitable opening 85 is provided in case 41 for accommodation of the heater 59. On the left hand end of the case 41 (FIGURE 5) is positioned a closure member or housing cover 52. This housing cover can, if desired, be an asbestos millboard. Immediately above the heater block 48 is positioned a compression spring 49 which bears against the upper wall of the case 41 to maintain the heater block in operational contact with the roller 46. The lower surface of the heater block and the upper surface of the roller 46 obviously are smooth machined surfaces to prevent wear as the roller 46 rotates with respect to the heater block. Effective contact is needed to be maintained between heater block 48 and roller 46 for transfer of heat by conduction from the heater block to the roller. Also good contact is necessary between the Watlow heater 59 and the surface of opening 58 so that heat will be properly conducted from the heater to the heater block. The shaft 42 is provided with a key-way 43 which in cooperation with a key maintains the pulleys 22 in their operative positions.

In assembling the apparatus illustrated in FIGURE 5 before the housing cover 52 is placed in its proper position a high temperature insulation 51, such as magnesia, Marinite, or other insulating filler, is packed in the housing, as illustrated, to conserve heat imparted by the Watlow heater and so that the apparatus will be in a proper heat conducting condition for transmission of heat from the heater 59 to the outer periphery of the roller 46.

The roller 46 illustrated in FIGURE 5 is a Nichrome roller.

The sealer roller assembly 33, illustrated partly in section in FIGURE 2, is constructed for the most part along lines similar to the construction of the preheat roller of FIGURE 5. The assembly of FIGURE 2 comprises a case 41 provided with bushings 44, a thrust washer 45, a shaft 42 having a key-way 43. This shaft 42 of FIGURE 2 is equipped with a sealing roller 69 having a different shape than the roller 46 of FIGURE 5. Roller 69 is also a Nichrome roller but has a narrower peripheral surface than roller 46. The width of the periphery of roller 69 determines the width of the seal of the polyethylene bags to be sealed. This roller 69 is maintained in this operative position on shaft 42 by dowel pin 47. A similar heater block 68, also of copper graphalloy, is provided immediately above and in contact with the roller 69. An opening 58 in the heater block 68 is for accommodation of a Watlow heater similar to that mentioned above. Compression spring 49 maintains operative contact between the polished roller surface of the heater block 68 and the upper polished surface of the roller 69. The space not occupied by the appratus just mentioned within case 41 of FIGURE 2 is also packed with a high temperature insulation 51. After all these apparatus parts and material are assembled the housing cover 52 is installed as shown.

The pressure roller assemblies 32, 32a and 32b are illustrated in FIGURE 3 of the drawing. These assemblies comprise a housing 41 or case similar to those of FIGURES 2 and 5. Also, bushings 44 and thrust washer 45 operatively support shaft 42 having a key-way 43. Mounted on shaft 42 within the housing is a pressure roller 62 and this pressure roller is maintained in place by dowel pin 47. The pressure roller 62 is composed of a wheel 63 on the outer surface of which is a layer of a silicone rubber 64. This silicone rubber wheel facing is preferably fitted as illustrated into a groove or a channel 65 around or in the periphery of the wheel 63. As installed in this manner the silicone rubber facing does not require use of screws or other apparatus for maintaining it in its proper position. This facing is used mainly to absorb irregularities in the peripheral surface of the sealing wheel 69 and in the thicknesses of the films being sealed. A set screw collar 61 is provided around shaft 42 at the upper surface of the roller 62 to maintain it tightly in its position.

An asbestos millboard cover 52 is positioned on case 41 as illustrated.

Each of the cases of FIGURES 2, 3 and 5 is provided with an opening 60 through which wheels 69, 62 and 46, respectively, protrude. It is the protruding portions of these several wheels which contacts the polyethylene material to be sealed on passing through the apparatus.

As noted in FIGURE 1, there are two long rows of roller assemblies. The vertical shafts 42 of the roller assemblies have wheels 22 mounted thereon held in place by keys properly positioned in keyways 43. The preheating, sealing and pressure rollers in the front row of roller assemblies rotate in counterclockwise direction when looking downward on the apparatus. The corresponding rollers in the rear row of roller assemblies rotate in a clockwise direction when looking downward on the apparatus. Thus, a bag to be sealed entering the right hand end of the apparatus of FIGURE 1 moves operatively from right to left. Immediately below the sealing apparatus in FIGURE 1 is illustrated diagrammatically a conveyor 37 on which the bags to be sealed can rest. The conveyer 37, belt 21 and the preheat, pressure and sealing rollers all operate at the same speed. By the same speed is meant the longitudinal movement of conveyor 37 and the longitudinal movement from right to left of the belts 21 are the same and these movements are the same as the peripheral speeds of the outer surfaces of the several rollers. When these several apparatus parts operate as just mentioned the bags to be sealed move at a uniformly operative speed or rate through the apparatus and there is no puckering and irregularity in the surfaces to be sealed or in the surfaces after sealing. In this manner when proper temperatures and rate of movement are provided a tight and properly fused seal is obtained.

In order to maintain proper and pressured contact between the front row of preheat, pressure and seal rollers and the rear row of rollers, the roller assemblies of the front row are spring loaded so as to bias their rollers tightly against the rear line of rollers. The preheat, pressure and seal roller assemblies of the rear row are rigidly maintained in their position by bolts 35, as shown. A loading spring assembly 66 is provided to bias each roller assembly of the front row in the direction of the corresponding roller assemblies of the rear row. Illustration of the spring loading assembly 66 is shown in FIGURE 4. This assembly comprises a threaded member 53 or stud, one end of which is of a smaller diameter than the main part of the stud. This difference in diameter is such as to provide a shoulder 67. The small diameter end of stud 53 is inserted into an opening 70 in cases 41 of FIGURES 3 and 5. This insertion is sufficiently far that shoulder 67 is maintained tightly against the outer surface of the housing 41. A spring tension adjusting lock nut 54 is positioned on stud 53 along with a common washer 55 as a bearing surface against which a compression spring 56 bears. A frame member 28, illustrated in FIGURE 1, is a channel or angle iron so positioned on the frame assembly 11 that the unthreaded end of the stud 53 can extend through openings in this angle or channel iron. Channel or angle iron 28 is shown in FIGURES 1 and 4. A pair of lock nuts 57, a lock nut 54a and nut 54 provide for adjusting the compression of spring 56. As shown in FIGURE 6, the take up nut on bolt 35 is threaded tightly against base plate 40, with the bolt proper extending through slot 39, so as to hold the case 41 of each of the preheat, pressure and sealing roller assembly on the back row tightly and immovably on base plate 40. The bolt 36 extending through slot 38 as illustrated in FIGURE 6 is maintained in a movable relation with respect to base plate 40a so that the case of the front row of roller assemblies can be adjusted and maintained in a biasing relation with respect to the rear row of roller assemblies. As mentioned hereinbefore, each heater block of FIGURE 2 and of FIGURE 5 is provided with openings 58 for insertion of a bayonet type heater for providing heat for sealing of the polyethylene material.

As illustrated in FIGURE 1, there are five pairs of preheat roller assemblies through which the material to be sealed passes at first for preheating up to a sealing temperature. The sixth pair of roller assemblies comprises a sealing roller assembly 33 in the rear row of roller assemblies and a pressure roller assembly 32a in the front row of roller assemblies. The seventh pair of roller assemblies also comprises a sealing roller assembly and a pressure roller assembly. However, in this seventh pair of roller assemblies the pressure roller assembly and the sealing roller assembly are staggered with respect to the positioning of the roller assemblies of the sixth pair. The eighth and the ninth pairs of roller assemblies are pressure roller assemblies and they are for the purpose of pressing the several films together while they are still hot to make certain that the sealing is proper. The heaters 59 are in one case 300 watt heaters and are inserted through openings 85 in the rows of cases 41 in the several preheated and sealing roller assemblies.

In order to maintain proper temperatures for sealing the polyethylene films a thermocouple 79 is positioned at the top surface of roller 69 of the sealing roller assembly 33a, as illustrated in FIGURE 2. The wiring diagram for providing electrical energy to the heaters is illustrated in FIGURE 10. Leads 71 conduct 230 volt electrical energy from a source, not shown, to the heating and control portion of this apparatus. The middle wire of this three-wire system is grounded. From one side of this three-wire circuit an auxiliary circuit 73 takes off for providing energy for one row of heaters, for example the row of heaters in the front row of roller assemblies, while circuit 74 conducts current from the other side to the rear row of heaters in the rear row of roller assemblies. These heaters are identified in FIGURE 10 by reference numeral 72. A circuit 80 leads from the middle ground wire and one of the outer wires to a temperature controller 81 which communicates by way of leads 84 to thermocouple 79 and by way of leads 86 to relays 77 and 78. Relays 77 and 78 are connected in parallel with leads 86 so that the two circuits 73 and 74 operate in unison. Relay 77 connects operably with relay 75 which regulates, that is, turns off and on, the electrical energy in circuit 73. Relay 78 communicates operably with relay 76 to turn off and on the current to the circuit 74.

The actual sealing temperature of polyethylene, that is the liner polyethylene, is somewhere between about 250° and 275° F. The preheating rollers are maintained at such temperatures that bags to be sealed are properly sealed by the sealing rollers maintained at about 350° F. The actual temperature of the polyethylene at the seal is between the stated 250° and 275° F.

The specific temperature to be maintained on the surface of the sealing rollers must be determined for any particular plastic to be sealed, taking into consideration the thickness of the films to be sealed and the speed which the material to be sealed passes through the apparatus. It will be realized by those skilled in the art that different plastics, that is, polyethylenes of different types, will require different temperatures for providing effective seals. Accordingly, the specific temperature to be maintained at the points of contact of the sealing rolls with the film to be sealed must be determined for each material to be sealed.

The temperature controller 81 can be any suitable and standard type of temperature controller. Such apparatus is common in the temperature control art and controllers can be obtained from almost any instrument supply house.

As mentioned hereinbefore, pulleys 22 and pulleys 20, 16 and 15 are grooved U. S. Rubber Co. timing belt pulleys. Belts 17 and 21 along with belts 23 and 24 are timing belts, all of which are provided with lugs 34 for meshing with grooves 30 in the timing belt pulleys. Pulleys 22 on shafts 42 of the several roller assemblies are also timing belt pulleys operated by timing belts 24. However, it is not essential that timing belt pulleys and timing belts be used in this assembly of apparatus because, if desired, sprocket wheels as illustrated in FIGURES 8 and 8a along with drive chains can be used. Bicycle-type chains are suitable for use with the sprocket wheels of FIGURES 8 and 8a. Thus, the belt 17, belts 21, belts 23 and belts 24 all can be replaced by bicycle chains. Accordingly, drive pulley 15, driven pulley 16, pulleys 20 and the smaller pulleys 22 then are all sprocket wheels.

Belts 21, if desired, can be replaced by bicycle-type chains because their main function is merely to guide and to hold in place the several thicknesses of the polyolefin film to be sealed as the films pass longitudinally through the apparatus. When bicycle-type chains are used to replace belts 21 the several rollers 25 and 26 need not be sprocket wheels because the function of these several wheels is mainly that of idlers.

When belts 21 are timing belts the pulleys 25 and 26 can be made of plastic material, for example, they can be made of a polyethylene known as Marlex polyethylene (a Phillips Petroleum Company trademark for a family of polyolefins). We find that a plastic or polyolefin material which is suitable for the production of rollers or pulley wheels 25 and 26 is a high density polyolefin, such as the polyethylene, above mentioned. This polyethylene has a molecular weight in the range of 25,000 to 200,000 or higher, a density of 0.940 to 0.980 gram per cubic centimeter and a crystallinity of at least 90 percent. A full description of the method for preparation of this plastic material is given in U.S. Patent 2,825,721. Briefly, this process involves polymerizing ethylene at a polymerization temperature in the range of 100° to 500° F., with a catalyst active for such polymerization and consisting essentially of chromium oxide supported on at least one material selected from the group consisting of silica, alumina, zirconia and thoria, at least part of the chromium being in the hexavalent state at the initial contacting of hydrocarbon with said catalyst, and recovering a resulting solid polymer. After production of the solid polyethylene, the rings, bearings and any other apparatus parts desired to be made of this material are extrusion molded into the proper shapes.

As stated, the density of this polyethylene material is between about 0.940 and 0.980 gram per cubic centimeter and the density is ordinarily determined on a sample of the mass polyethylene in non-filamentary form. The sample is prepared for the determination of density by compression molding of the polyethylene at a temperature of 340° F. in a mold provided with a water jacket through which water can be circulated. The sample is maintained at about 340° F. until it is completely molded. It is then cooled from 340° to 200° F. at the rate of approximately 10 Fahrenheit degrees per minute. Water is then circulated through the mold to continue the cooling to 150° F., the rate not exceeding 20 Fahrenheit degrees per minute. The polyethylene is then removed from the mold and cooled to room temperature. A small piece of the solidified polyethylene is cut from the compression molded sample and inspected to make sure that it is free of voids and that it has a sufficiently smooth surface to prevent the trapping of air bubbles on its surface. The small sample is placed in a 50 ml. glass stoppered graduate. Carbon tetrachloride and methylcyclohexane are then allowed to run into the graduate from separate burettes in such proportions that the sample is suspended in the mixed solution, i.e., it neither floats nor sinks. The graduate is shaken during the addition of the liquid in order that the two liquids mix thoroughly. A total liquid volume of 15 to 20 ml. is required. After the liquids have been so proportioned that the polyethylene is suspended therein without sinking or floating, the density of the liquid mixture is equal to the density of a solid polyethylene. The polyethylene is then removed from the liquid and a portion of the liquid mixture of carbon tetrachloride and methylcyclohexane is transferred to a Westphal balance and the specific gravity of the liquid is measured at a temperature in the range of 73° to 78° F. This specific gravity is equal to the specific gravity of the polyethylene. For most practical purposes, the specific gravity is considered identical to the density. However, if a precise conversion to actual density units, grams per cubic centimeter, is desired this is readily referrable to water at 4° F. by calculations which will readily be evident to those skilled in the art. The precision of a single specific gravity determination is ordinarily within ±.0002. The molecular weight is determined by measuring the time required for a filtered solution of 0.1000 gram of the polyethylene in 50 ml. of tetralin (measured at room temperature, that is, about 75° F.) to run through the marked length on a size 50 (0.8–3.0 centistokes) Ostwald-Fenske viscosimeter at a temperature of 130° C. (the viscosimeter being immersed in a thermostatically controlled oil bath) and measuring also the time required for an equal volume of tetralin containing no polyethylene to run through the same distance on the same viscosimeter. The molecular weight is calculated in accordance with the following formula:

$$M_w = \frac{K 2.303 \log Vr}{C}$$

where K equals 24,450, C equals 0.183, Vr equals time, in seconds, required for solution to run through the viscosimeter divided by the corresponding time required the polymer-free tetralin, both at 130° C. A single determination of molecular weight originally has a precision of ±1,000 molecular weight units.

The crystallinity of this polyethylene is determined by nuclear magnetic resonance. The percentage crystallinity represents the percentage by weight of the total polymer which is crystalline rather than amorphous.

FIGURE 9 illustrates diagrammatically one form of pulley wheel 25 which is made of the polyolefin described above.

The plastic materials which are sealed by the heat sealing apparatus of this invention includes in addition to polyolefin materials, such other thermoplastic materials as polyvinylpyridine, polyvinylchloride, vinylchloride-acetate chloride copolymer, cellulose films (with adhesive), polytetrafluoroethylene polymers, acrylonitrile-styrene copolymers and other plastic and thermoplastic polymers and copolymers with or without adhesive.

While certain embodiments of the invention have been described for illustrative purposes, the invention obviously is not limited thereto.

We claim:

1. Apparatus for sealing the upright flattened ends of filled thermoplastic bags comprising, in combination, a first pair of opposed preheat rollers positioned operatively adjacent each other in such a manner as to contact and to preheat said flattened ends when passed therebetween, means positioned adjacent said rollers for heating same, a second pair of opposed rollers positioned on the downflow side of said first pair of rollers as regards direction of movement of said bags, one roller of said second pair having a heating means in contact therewith and being a first sealing roller, the other roller of said second pair being positioned adjacent said one roller in such a manner that on passage of said bags therebetween said other roller presses said flattened ends tightly against said one roller so as to transfer heat from said one roller to said flattened ends thereby causing same to be sealed, a third pair of opposed rollers positioned on the downflow sides of said second pair of rollers, said third pair of rollers comprising one roller having a separate heating means in contact therewith and being a second sealing roller, the other roller of said third pair being positioned adjacent said one roller of the third pair in such a manner that upon passage of said flattened ends to be sealed therebetween said one roller of this third pair presses the films tightly against the other roller so as to transfer heat from this latter sealing roller to said flattened ends thereby causing the same to be sealed further, a fourth pair of opposed rollers on the downflow side of said third pair, the rollers of said fourth pair being pressure rollers and adapted to compressing the previously flattened ends thereby further completing the seal of said flattened ends, the sealing roller of the third pair of rollers being on the downflow side of said other roller of said second pair of rollers, said pairs of rollers being positioned on two upright rows of shafts, one row of shafts being fixed and the other row being movable horizontally toward and away from said one row, and flexible means urging said other row toward said one row.

2. Apparatus for sealing the upright flattened upper ends of an upright thermoplastic bag comprising, in combination, a plurality of pairs of opposed preheat rollers positioned in sequence in such a manner as to contact and to heat said flattened ends upon passage of same between successive pairs of rollers from the first pair to the final pair of said plurality of pairs, a first pair of opposed rollers positioned near and downstream of the final pair of preheat rollers, a first roller of said first pair of rollers being a heat sealing roller and the other a pressure roller, a second pair of opposed rollers positioned on the downstream side of said first pair of rollers, a first roller of said second pair being a pressure roller and the other being a heat sealing roller, and successive pairs of opposed pressure rollers on the downstream side of said second pair of rollers, all of said pairs of rollers being so positioned on upright shafts as to form two rows of rollers in such a manner that said flattened ends of said bag can pass between the first pair of rollers and sequentially between the rollers of each successive pair of rollers, the heat sealing rollers and said preheating rollers having means for heating these rollers, each row of said two rows of rollers having one of the sealing rollers, each roller of one of the rows of rollers being spring loaded biasing its roller against the corresponding roller of the other row of rollers, a pair of opposed guiding belts positioned below the rollers and a pair of opposed guiding belts positioned above the rollers so that the contacting surfaces of said belts are in a vertical plane passing between the pairs of rollers, the belts being adapted to move at the peripheral speed of the rollers in such a manner as to contact and maintain the flattened end of said bag in an operable sealing position with respect to the rollers.

3. The apparatus of claim 2 including means for rotating one row of rollers in a clockwise direction and the other row in a counterclockwise direction at the same peripheral speeds, means for rotating said guiding belts at the peripheral speed of said rollers and in the same direction as the row of rollers on the same side of said vertical plane, and conveyor means in said plane below the lower pair of belts operable at the peripheral speed of said rollers and said belts.

4. An assembly for supplying heat for sealing thermoplastic film comprising, in combination; a hollow body member having sidewalls and top and bottom closures; a shaft extending operably through the top closure into said body member; a power pulley on said shaft outside of said body member; a metal wheel positioned on said shaft within said body member and rotatable therewith; an opening in one sidewall, a portion of the periphery of said wheel extending rotatably through said opening; a fixed heat conducting first means slidably positioned against a surface of said wheel; second means biasing said first means against said surface of said wheel; a support frame for said body member adjacent said bottom closure; means for slidably attaching said body member to said support frame; a heater in contact with said first means for heating same; a frame member fixed to said support frame and spaced from the side of said body member opposite the opening thru which said wheel protrudes; and spring biasing means intermediate said frame member and said body member urging said body member away from said frame member.

5. Apparatus for heat sealing the flattened upright ends of polyolefin bags comprising, in combination, a first pair of opposed preheat rollers provided with heating means, a second pair of opposed rollers downstream of said first pair of rollers as regards direction of travel of said bags, one roller of said second pair being a heat sealing roller provided with heating means and the other a pressure roller, a third pair of opposed pressure rollers downstream of said second pair of rollers, the pairs of rollers being positioned rotatably on vertical shafts so as to form two parallel rows of horizontal rollers, means for rotating the rollers on each row in like directions and the rollers in opposite rows in opposite directions so that the flattened ends of bags to be sealed pass from the first pair of rollers through the second and third pairs sequentially, each roller of one row of rollers being spring loaded in such a manner that the rollers of said one row press firmly in the direction of the corresponding rollers of the other row and a horizontally movable conveyor belt extending parallel with the horizontal plane of said rollers and directly therebelow.

6. Apparatus for heat sealing the upright flattened ends of filled upright thermoplastic bags comprising, in combination, a plurality of pairs of opposed first preheat rollers, a plurality of pairs of opposed second rollers following said first preheat rollers as regards direction of travel of said bags, one roller of each second pair of rollers being a heat sealing roller and the other a pressure roller, a plurality of pairs of opposed third pressure rollers following said second rollers, the pairs of rollers being rotatably positioned on upright shafts so as to form two parallel rows of horizontally rotatable rollers, means for rotating the rollers of each row in the same direction and opposite rows in opposite directions so that flattened ends of bags to be sealed pass sequentially from the first pair of preheat rollers, between the rollers of all other pairs and from the final pair of pressure rollers, each roller of one row of rollers being spring loaded in such a manner that the rollers of said one row press firmly in the direction of the corresponding rollers of the other row, and conveyor means below the rollers for conveying said bags in the direction of rotation of said rollers at their points of contact with bags being sealed.

7. Apparatus for heat sealing the upright folded and flattened ends of upright thermoplastic bags comprising, in combination, a first pair of opposed preheat rollers, a second pair of opposed rollers positioned downstream of said first pair of rollers as regards direction of travel of said bags, one roller of said second pair being a heat-sealing roller and the other roller a pressure roller, a third pair of opposed pressure rollers positioned downstream of said second pair of rollers, the pairs of rollers being rotatably supported on upright shafts so as to form two parallel rows of horizontally rotatable rollers, means for rotating the rollers of each row in like directions and opposite rollers in opposite directions so that the flattened ends of the bags to be sealed pass from the first pair of rollers, through the second and third pairs sequentially, each roller being enclosed within a case, each case having an opening in one side, the openings in the cases enclosing the rollers of each pair facing each other, the periphery of each roller extending through the opening of its enclosing case in such a manner that the peripheries of the rollers of each separate pair contact each other, each preheat roller and each heat-sealing roller having separate heat conducting means in contact therewith, and each heat conducting means having a separate heating means in contact therewith, each roller of one row of rollers being spring loaded in such a manner that the rollers of said one row press firmly in the direction of the corresponding rollers of the other row to apply pressure to the flattened ends of said bars.

References Cited by the Examiner

UNITED STATES PATENTS

| | | | |
|---|---|---|---|
| 2,291,280 | 7/1942 | Joplin | 156—582 |
| 2,422,676 | 6/1947 | Hamen et al. | 156—582 |
| 2,566,799 | 9/1951 | Humphrey | 156—583 |
| 2,591,383 | 4/1952 | Spalding | 154—42 |
| 2,598,900 | 6/1952 | Frye | 219—21.4 |
| 2,697,473 | 12/1954 | Techtmann | 154—42 |
| 2,722,735 | 11/1955 | Beamish | 154 |
| 2,906,847 | 9/1959 | Grevich | 219—21.4 |

EARL M. BERGERT, *Primary Examiner.*

CARL F. KRAFFT, *Examiner.*